Aug. 28, 1928.
J. A. CHARTER
1,682,368
ENGINE STARTER
Filed Feb. 10, 1926
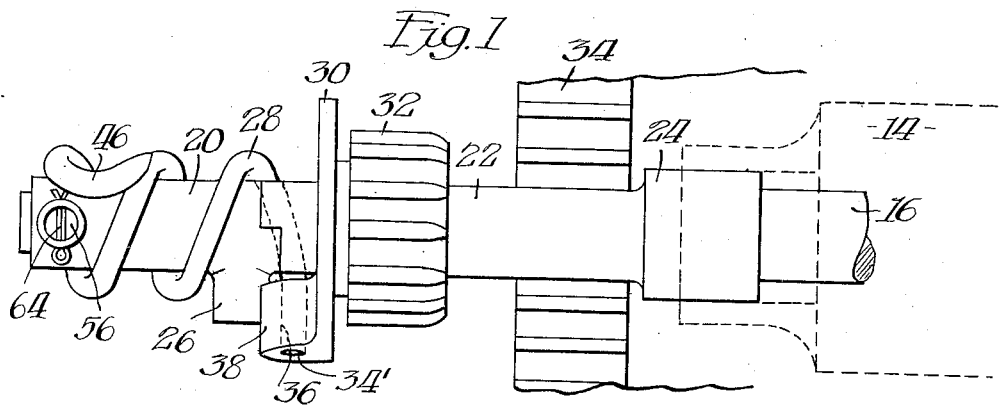
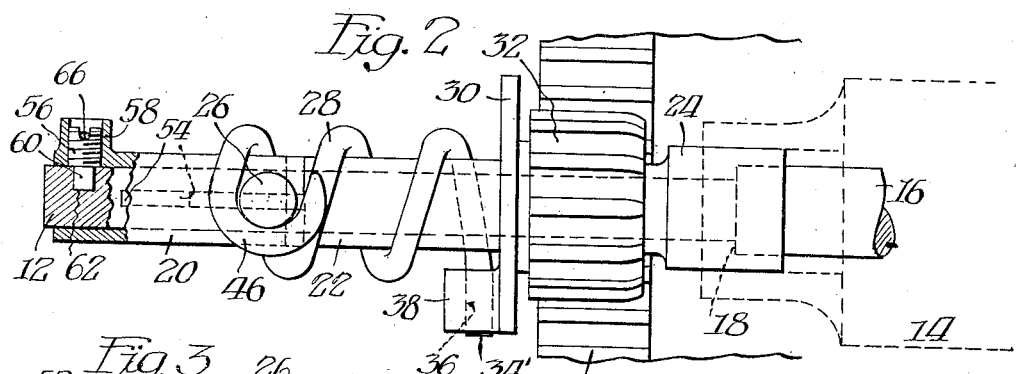
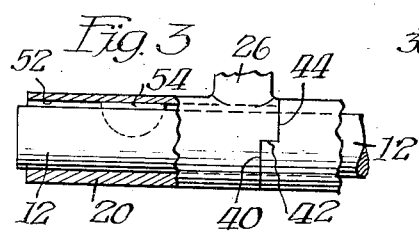
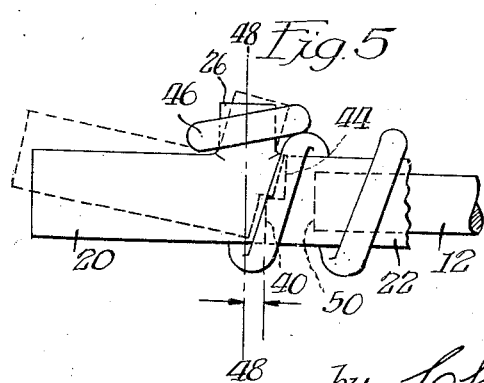
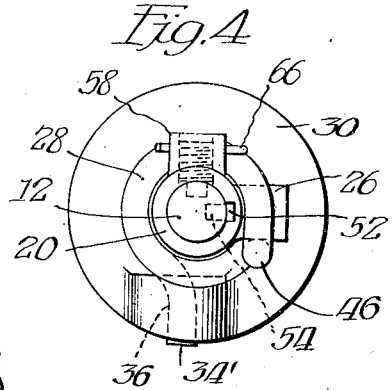
Inventor:
James A. Charter,
by Cheever & Cox
Attys.

Patented Aug. 28, 1928.

1,682,368

UNITED STATES PATENT OFFICE.

JAMES A. CHARTER, OF CHICAGO, ILLINOIS.

ENGINE STARTER.

Application filed February 10, 1926. Serial No. 87,266.

This invention relates to the problem of placing a gear or encircling spring, or the like, on a hollow shaft or sleeve between spaced, solid projections on the sleeve.

United States Patent No. 1,554,623, dated September 22, 1925, illustrates an engine starter mechanism having a hollow sleeve bearing 14, gears 18 and 20 encircling spring 32, functionally cooperating with a rigid member 36 projecting from the sleeve.

In that patent the problem of this invention does not occur because sleeve 14 is of uniform size throughout except for the one projection 36. It is, however, in using the invention of said prior patent, necessary in some instances to provide at one end of the sleeve 14, remote from the projection 36, and on the other side of said gears from said projection, a solid enlargement of greater diameter than the interior diameter of the gears and spring referred to. In such a construction, it is ordinarily impossible to apply the gears and spring between said two rigid projections on the sleeve without an excessive amount of machine work and without very expensive operations in finishing and otherwise.

The object of this invention is to provide an exceedingly cheap and simple, easily constructed, efficiently operated means for applying the gears and spring between the two separated rigid projections upon the sleeve.

The invention further consists in numerous features and details of construction which will be hereafter more fully set forth in the specification and claims.

Referring to the drawings in which like numerals represent the same parts throughout the several views:

Figure 1 is a side view of mechanism illustrating this invention in its preferred form, showing the two gears in disengaged position.

Figure 2 is a central view taken at 90° from the position of Figure 1, called, for instance, a plan view, showing the gears in engaged position.

Figure 3 is a detailed view showing the key-way running clear through from end to end of the tail piece or driving member.

Figure 4 is an end view, taken at the lefthand end of Figure 2.

Figure 5 is a side view of the lefthand end of the juncture of two separable parts of the sleeve entering into this invention, and showing in dotted lines the method of disassembling while the spring hereafter referred to is in place.

As in said prior patent, the operative mechanism improved by this invention is applied to the shaft 12 of a conventional starting motor or device 14, commercially applied to an ordinary motor car engine or the like.

In the particular case here illustrated, this motor shaft 12 has at its end near the motor an enlargement 16, of substantially greater diameter, joining the projecting shaft 12 in a shoulder 18.

As in said prior patent, the operative parts of the mechanism improved by this invention include a sleeve surrounding said shaft, made in the present instance in two parts 20 and 22, the inner end of sleeve portion 22 being provided with an enlarged head 24 into which the enlarged portion 16 of shaft 12 fits as clearly shown in Figure 2, thereby preventing the sleeve device 20—22 from endwise movement to the right beyond the position shown in the drawing. Sleeve mechanism 20—22 also carries a projecting lug 26 specifically located on sleeve section 20, the same corresponding to and performing the functions of the heretofore referred to lug 36 of said prior patent.

Sleeve 20—22 carries an embracing spring 28, corresponding to spring 32 of said prior patent, operatively connected to a flange 30 at the rear of a gear or pinion 32 adapted to intermesh under proper conditions with a larger gear 34, operatively connected with the engine which is to be started.

Spring 28 and pinion 32 are positioned on sleeve 22 between lug 26 and enlargement 16 at the end of the shaft, both of which are of greater external diameter than the interior diameters of the spring and pinion and the problem solved by this invention is the economical constructing of the device so as to readily position this spring and pinion, particularly when the specific means herein shown of coupling the spring and flange 30 is used, the same consisting in inserting the straight end 34 of the spring 28 through a diametrically arranged perforation 36 in lug 38 on flange 30 of gear 32.

The desired result is accomplished by, in the process of manufacture, severing the sleeve into the two parts 20—22 along the lines 40—42—44 immediately adjacent to the side of lug 26 which is nearest to the pinion 32 and the enlarged end 24 of the sleeve.

As in said prior patent, spring 34 at its end adjacent to lug 26 has a reversed loop 46 loosely embracing said lug 26. The cut 40—42—44 in the sleeve is made of such a size and so located with reference to the central axis 48 (Figure 5) through the lug 26 that, as shown in Figure 5, the sleeve section 20 may, when moved to the left beyond the end 50 of shaft 12, be swung from the full line to the dotted line position of said Figure 5, thereby permitting the complete removal of the sleeve section 20. Conversely in this position, if the sleeve sections are separated, the operator has only to first so move sleeve section 20 that lug 26 enters spring loop 40 and then tilt the sleeve section downwardly from dotted to full line position of Figure 5 whereupon the entire mechanism may be slid to the right along shaft 12.

In order to detachably lock the entire sleeve mechanism and attached parts in non-rotatable position upon shaft 12, sleeve section 20 is provided with a key-way 52 extending its entire length, enterable by a Woodruff key 54 inserted in the end portion of shaft 12.

When sleeve section 20, thus keyed to shaft 12, reaches its extreme righthand position, as shown in Figure 2, locking set screw 56 is inserted in the lug 58 provided for it in sleeve section 20, the lower end 60 of the screw entering shaft 12 in a recess or hole 62 provided for it in shaft 12. This securing device prevents the starter mechanism, improved by this invention, from moving in any direction, especially to the left, along shaft 12.

The screw mechanism 56, just described, is preferably locked in position through the agency of a cotter pin 64 inserted through the walls of the lug 58 at such a point that the pin, when inserted, lies in the screw driver slot 66 in the upper end of screw 56.

When the parts are assembled as illustrated and described, the mechanism operates in exactly the same manner as shown, described and claimed in said Patent No. 1,554,623.

In assembling the mechanism on a bare starter shaft 12, the operator first places the pinion 32 on the sleeve section 22 to approximately the position of those parts shown in Figure 1, preferably keeping the left-hand end of the sleeve 22 clear of the end 50 of shaft 12, as shown in Figure 5. In this position, he now inserts the straight end 34 of the spring 28 in perforation 36 in lug 38 on the flange 32 of the pinion and then moves the parts just referred to so that the end 50 of the shaft 12 is exposed, whereupon he inserts the Woodruff key 54, after which he takes the sleeve section 20 and by manipulating it through the dotted line position to the full line position of Figure 5, gets lug 26 into loop 46 of spring 28 and gets the sleeve section 20 in alignment with sleeve section 22, whereupon he moves the entire mechanism to the right until it is possible for him to insert the locking screw 56, heretofore described.

In case of disassembling, the reverse operation are obvious.

Having thus described my invention, what I claim as new and desire to secure by Letters Patent is:

1. In an engine starter, a commercial unit comprising a shaft made in two abutting parts, a pinion rotatable and reciprocable on one part of said shaft, a rigid obstruction preventing removal of the pinion from the end of that part of the shaft which is away from the second part of the shaft, a projection on the second shaft part, movable between the convolutions of a spring, such a spring encircling said shaft parts between said projection and said pinion, means detachably affixing the spring to the pinion, an end loop or stop on the spring engaging said projection, and means detachably, non-rotatively, rigidly securing the adjacent ends of the shaft together whereby for operating purposes these are as one.

2. In mechanism of the class described, a commercial unit comprising a hollow sleeve made in two abutting parts, a pinion rotatable and reciprocable on one part of said sleeve, a rigid obstruction preventing removal of the pinion from the end of that part of the sleeve which is away from the second part of the sleeve, a projection on the second sleeve part, movable between the convolutions of a spring, such a spring encircling said sleeve parts between said projection and said pinion, means detachably affixing the spring to the pinion, an end loop or stop on the spring engaging said projection, and means detachably non-rotatively, rigidly securing the adjacent ends of the sleeve together whereby for operating purposes these are as one.

3. In an engine starter, a commercial unit comprising a hollow sleeve made in two abutting parts, a pinion rotatable and reciprocable on one part of said sleeve, a rigid obstruction preventing removal of the pinion from the end of that part of the sleeve which is away from the second part of the sleeve, a projection on the second sleeve part, movable between the convolutions of a spring, such a spring encircling said sleeve parts between said projection and said pinion, means detachably affixing the spring to the pinion, an end loop or stop on the spring engaging said projection, means detachably non-rotatively, rigidly securing the adjacent ends of the sleeve together whereby for operating purposes these are as one, said securing means including a shaft slidable through both sleeve parts, a part on said shaft engaging said rigid obstruction on the first sleeve part, a connection preventing rotation between said shaft and the second sleeve part, a rotation preventing joint between the two sleeve parts, and means rigidly securing the second sleeve part to the shaft.

4. In an engine starter, a shaft made in two abutting parts, a projection on each of the shaft parts, a gear and a spring encircling the shaft, rotatable thereon and reciprocable between said projections, a stop end on said spring looping one of said projections through which rotation of that shaft section forces the rotation of the gear, a rotation preventing separable joint between the two shaft sections so shaped and located adjacent to the projection which engages the spring loop end that the adjacent shaft section may be tilted from its axis to disengage the projection from the spring end simultaneously with the separation of the abutting shaft ends, and means detachably rigidly securing the two shaft ends in aligned engagement.

5. In an engine starter, a hollow sleeve made in two abutting parts, a projection on each of the sleeve parts, a gear and a spring encircling the sleeve, rotatable thereon and reciprocable between said projections, a stop end on said spring looping one of said projections through which rotation of that sleeve section forces the rotation of the gear, a rotation preventing, separable joint between the two sleeve sections, so shaped and located adjacent to the projection which engages the spring loop end that the adjacent sleeve section may be tilted from its axis to disengage the projection from the spring end simultaneously with the separation of the abutting sleeve ends, and means detachably, rigidly securing the two sleeve ends in aligned engagement.

6. In an engine starter, a hollow sleeve made in two abutting parts, a projection on each of the sleeve parts, a gear and a spring encircling the sleeve, rotatable thereon and reciprocable between said projections, a stop end on said spring looping one of said projections through which rotation of that sleeve section forces the rotation of the gear, a rotation preventing, separable joint between the two sleeve sections, so shaped and located adjacent to the projection which engages the spring loop end that the adjacent sleeve section may be tilted from its axis to disengage the projection from the spring end simultaneously with the separation of the abutting sleeve ends, and means detachably, rigidly securing the two sleeve ends in aligned engagement, said securing means including a shaft slidable through the sleeve parts equipped with appropriate fastening devices.

7. In an engine starter, a shaft made in two abutting parts, each having a projection, a spring on the shaft, between said projections prevented from removal by said end projections, a rotation preventing separable joint between the two sections, and means detachably rigidly securing the two shaft ends in non-rotatable aligned engagement.

8. In an engine starter, in combination with a shaft, a sleeve slidable thereon carrying a spring stop, a keyway the entire length of the sleeve, a key in the shaft, means detachably securing the sleeve against longitudinal movement on the shaft, another sleeve on the shaft non-rotatably engaging the end of the first sleeve, and a spring engaging the spring stop for the purposes set forth.

9. In an engine starter, in combination, a coiled spring having separated convolutions, a shaft through the spring, made in two abutting parts interfitted so as to be non-rotative with reference to each other, a lug on one of the shaft parts, enterable between and movable along the spring convolutions, and means detachably securing the shaft parts together for the purposes set forth.

In witness whereof, I have hereunto subscribed my name.

JAMES A. CHARTER.